(12) United States Patent
Pavageau et al.

(10) Patent No.: US 10,884,565 B2
(45) Date of Patent: Jan. 5, 2021

(54) DEVICE FOR THE ENTRY OF DATA TO BE PLACED ON A TOUCH PANEL OF A TERMINAL, CORRESPONDING METHOD AND ENTRY SYSTEM

(71) Applicant: INGENICO GROUP, Paris (FR)

(72) Inventors: Stephane Pavageau, La Roche de Glun (FR); Andre Carabelli, Saint-Peray (FR); Benoit Pouhaer, Antony (FR)

(73) Assignee: INGENICO GROUP, Paris (FR)

( * ) Notice: Subject to any disclaimer, the term of this patent is extended or adjusted under 35 U.S.C. 154(b) by 79 days.

(21) Appl. No.: 16/439,152

(22) Filed: Jun. 12, 2019

(65) Prior Publication Data

US 2020/0026392 A1 Jan. 23, 2020

(30) Foreign Application Priority Data

Jun. 15, 2018 (FR) ...................................... 18 55293

(51) Int. Cl.
| | | |
|---|---|---|
| *G06F 3/044* | (2006.01) | |
| *G06F 3/0354* | (2013.01) | |
| *G06F 3/041* | (2006.01) | |

(52) U.S. Cl.
CPC ........ *G06F 3/0446* (2019.05); *G06F 3/03547* (2013.01); *G06F 3/0418* (2013.01)

(58) Field of Classification Search
CPC .. G06F 3/0446; G06F 3/03547; G06F 3/0418; G06F 3/0393; G06F 21/31;
(Continued)

(56) References Cited

U.S. PATENT DOCUMENTS

| | | | | |
|---|---|---|---|---|
| 9,965,116 B1 * | 5/2018 | Wolter | ................ | G06F 3/04886 |
| 2006/0256090 A1 * | 11/2006 | Huppi | ................ | A63F 13/2145 |
| | | | | 345/173 |

(Continued)

FOREIGN PATENT DOCUMENTS

| | | |
|---|---|---|
| EP | 2270639 A1 | 1/2011 |
| FR | 3055990 A1 | 3/2018 |
| WO | 2011084917 A2 | 7/2011 |

OTHER PUBLICATIONS

French Search Report dated Jan. 24, 2019 for corresponding French Application No. FR1855293, filed Jun. 15, 2018.
(Continued)

*Primary Examiner* — Amit Chatly
(74) *Attorney, Agent, or Firm* — David D. Brush; Westman, Champlin & Koehler, P.A.

(57) ABSTRACT

A system of data entry includes a touch panel of a terminal and a data-entry device to be placed on the touch panel. The touch panel includes a matrix of electrodes having nodes and is managed by a control unit configured carrying out cycles of capacitive scanning and measurement of variance of capacitance of the nodes relative to reference values, detecting meaningful touches on the touch panel and recalibrating reference values. The device includes a plate having a lower face for placing the device on the touch panel; and an upper face with a matrix of entry zones having a thickness enabling a detection of a finger by the touch panel; a flat contact pad electrically conductive and fixedly attached to the lower face; and a network of conductive tracks stretching over at least a part of the upper face and being electrically connected to the contact pad.

15 Claims, 4 Drawing Sheets

(58) Field of Classification Search
CPC .......... G06F 2203/04809; G06F 21/83; G06F 3/044; G06F 3/04886; G06F 3/0416
See application file for complete search history.

(56) References Cited

U.S. PATENT DOCUMENTS

| | | | |
|---|---|---|---|
| 2011/0248947 A1* | 10/2011 | Krahenbuhl | G06F 1/1626 345/174 |
| 2015/0242612 A1 | 8/2015 | Moberg et al. | |
| 2015/0378492 A1* | 12/2015 | Rosenberg | G06F 3/016 345/174 |
| 2017/0168634 A1* | 6/2017 | Depold | G06F 3/0412 |
| 2018/0024672 A1 | 1/2018 | Thiele et al. | |
| 2019/0042040 A1* | 2/2019 | Kumar | G06F 3/04886 |
| 2019/0265836 A1* | 8/2019 | Tanuma | B60K 35/00 |

OTHER PUBLICATIONS

English translation of the French Written Opinion dated Jan. 24, 2019 for corresponding French Application No. FR1855293, filed Jun. 15, 2018.

* cited by examiner

DEVICE FOR THE ENTRY OF DATA TO BE PLACED ON A TOUCH PANEL OF A TERMINAL, CORRESPONDING METHOD AND ENTRY SYSTEM

1. TECHNICAL FIELD

The present technique relates to the field of the entry of data into terminals (mobile telephones, computers, tablets, payment terminals, automatic cash dispensers or teller machines (ATMs), communications terminals that temporarily convert into payment terminals, etc.).

More specifically, the present technique relates to a data-entry system comprising a touch panel of a terminal and a data-entry device to be placed on this touch panel (also called touch screen).

The present technique applies especially but not exclusively to the entry of confidential codes or personal identification codes (PIN i.e. personal identification number code) on a touch panel of a terminal, for example for visually impaired persons.

2. TECHNOLOGICAL BACKGROUND

Touch pads are widely used to enter data into data-processing IT systems. For example, mobile telephones, computers, tablets or payment terminals and automatic teller machines (ATMs) have touch panels to facilitate data entry by users.

To make an entry, the user can select one or more keys (each associated with an alphanumerical character) on a virtual keypad displayed on the touch panel, using a finger or a stylus. There is thus no longer any need for a physical keypad to enter data. However, the entry of data with a virtual keypad presents drawbacks, especially for visually impaired persons as well as technophobic individuals unused to digital usages. In particular, unlike physical keypads, virtual keypads are displayed on a flat screen and do not allow certain users (especially visually impaired persons) to find their way spatially on the virtual keys.

This drawback is particularly difficult for payment terminals or automatic teller machines (ATMs) that have a touch panel. Indeed, when a user uses his bankcard to make a payment or withdraw cash, he must enter his PIN code to get authenticated. It is not possible for a visually impaired person to enter his PIN code on a virtual keypad displayed on a touch panel.

A European directive (being drafted) will, in the near future, require merchants and bankers to provide a solution for visually impaired persons. The prior-art solution consists in always providing an electronic physical keypad connected to a payment terminal even if a virtual keypad is available on the touch panel. The cost of manufacturing payment terminals or automatic teller machines (ATMs) is thus increased without the solution being truly worthwhile from the technical and aesthetic viewpoints. Indeed, the physical keypad intended for visually impaired persons has to be secured against hacking, thus increasing its cost, and this keypad is generally not aesthetically integrated into the touch panel solution.

Besides, in addition to problems of aesthetics and cost, there is also a major problem of security. Indeed, unlike with the standard user, vulnerable individuals such as the visually impaired must often seek the help of persons whom they do not necessarily know. This is a great source of stress for vulnerable persons. For example, when typing out a PIN code and thus revealing sensitive information, it must be made sure that the person from whom help may be sought will not try to keep this information for fraudulent use.

In the same way, many users are not capable of efficiently detecting and combating spy applications and spyware installed on their communications terminals. Now, increasing numbers of communications terminals are used for purposes of entering confidential information and especially payment information (PIN codes, bankcards etc.). To counter these problems of fraud, the existing solutions propose a random display of the virtual keypad; in such a random display, the keys of the keypad are disposed randomly and the user must identify the keys to be able to enter his confidential data (for example the PIN code). A secure operation installed on the communications terminal is in charge of establishing correspondence between the user's entry zones and the corresponding characters. It can be understood that there are many users for whom such a method is not suitable, especially visually impaired persons or more generally persons who are isolated from the digitization of these touch-panel entry operations.

There is therefore a need to provide a solution enabling users to enter confidential data on terminals (payment terminals and communications terminals for example) comprising a touch panel, in ensuring the security of the entered data while reducing the cost of this solution and preserving the aesthetic aspect created by the use of touch panels.

3. SUMMARY

The invention makes it possible especially to facilitate operations of data entry on a touch screen (also called a touch panel) especially for visually impaired persons. The solution of the invention however is not limited to use by a visually impaired person and can be used for any person for the simple, ergonomic and secure entry of (confidential or non-confidential) information on a touch panel.

One particular embodiment of the invention proposes a system of data entry comprising a touch panel of a terminal and a data-entry device to be placed on said touch panel, said touch panel being capacitive, comprising electrodes in rows and columns forming a matrix of electrodes comprising nodes and being managed by a control unit configured to carry out cycles of capacitive scanning and measurement of variance of capacitance of the nodes relative to reference values, detect meaningful touches (also referred to as "taps") on the touch panel as a function of the measured variations in capacitance and recalibrate the reference values as a function of the measured variations in capacitance. The system comprises:

- a generally parallelepiped-shaped plate comprising a generally flat lower face, for placing the device on the touch panel and an upper face comprising a keypad-forming matrix of entry zones, the entry zones having a thickness configured to enable a detection of a finger by the touch panel when the device is placed on the touch panel;
- at least one flat, contact pad that is electrically conductive and fixedly attached to the lower face, said at least one contact pad having a capacitance enabling it to be detected as a meaningful touch (tap); and
- a network of conductive tracks stretching over at least a part of the upper face and being electrically connected to said at least one contact pad, the network of conductive tracks having a capacitance such that it is not detected as exerting a meaningful touch and occupying a surface area that is, on the one hand, greater than the surface area occupied by said at least one contact pad and, on the other hand, sufficient so that, during the capacitive scanning cycles, the network of conductive tracks interacts with several nodes of the matrix of electrodes in the form of charges that travel back and forth in the network of conductive tracks, as well as between said at least one contact pad and the network of conductive tracks, thus changing the charge of the network of conductive tracks and of said at least one contact pad and therefore, for the nodes of the matrix of electrodes situated facing the network of conductive tracks and said at least one conductive pad, called concerned nodes, the control unit measures the variations in capacitance that are not fixed in successive cycles and therefore decides not to carry out a recalibration of the reference values for the nodes concerned.

The proposed solution therefore relies on a wholly novel and inventive approach in which an entry device intended to be placed on the touch panel of a terminal is provided to obtain a system that operates as follows:

through the detection of the contact pad or contact pads present on the lower face of the entry device and coming into contact with the touch panel when the device is placed on it, the terminal can detect this placing as well as the orientation of the device on the touch panel (several solutions to determine this orientation are described in detail here below); then knowing the orientation of the device on the touch panel and therefore the position, on the touch panel, of each of the entry zones (forming entry keys) of the device, whenever the terminal detects a touch by a finger of the user on the touch panel through one of the entry zones of the device, it can determine which is the keypad character (for example a character among the digits 0 to 9) or the keypad function key (for example cancel, erase and confirm) that this touch corresponds to.

As explained in detail here below, with reference to the figures, the detection of the contact pad or contact pads (as a meaningful touch or touches on the touch panel) is kept possible through the network of conductive tracks present on the upper face of the entry device and electrically connected to the contact pad or pads. Indeed, the network of conductive tracks prevents the terminal from carrying out a recalibration of the touch panel, i.e. a recalibration (an update), at the end of a few capacitive scanning cycles, of one or more reference values associated with the nodes of the matrix of electrodes of the capacitive touch panel. The touch panel recalibration mechanism is aimed at compensating for (and if possible causing the disappearance), from the results of the detection, of any electrically conductive object (for example a drop of water) that comes into contact with the touch panel and which has an excessively stable behavior and therefore constitutes additional noise to be eliminated (unlike a touch by the user's finger). Therefore, if it is not prevented, the recalibration of the touch panel makes the contact pad or pads "invisible" (i.e. non-detected) as additional noise. The recalibration mechanism for recalibrating the touch panel and the way in which the network of conductive tracks makes it possible to prevent it are presented in detail further below.

Thus, the proposed solution removes the need for the use of a physical pad, while at the same time enabling an entry of information that is:

simple and ergonomically, through easy position-finding of the entry zones of the device (especially but not exclusively for a visually impaired person), and secure, since it does not require that the user should seek help from a third party and since there are no finger marks on the touch panel (which could help a fraudulent person retrieve a code that has just been entered). The securing can be further increased in the case (described in detail here below) where, after having detected the placing of the device on the touch panel, the terminal switches into a suitable entry mode (here below called a "blind mode") in which no virtual keypad is displayed on the touch panel.

In addition, the entry device can be a personal object, which is an advantage in terms of hygiene for an object that is touched. In the case of a shared object, it can be envisaged that the entry device will be made of "antibacterial" material (for example material with silver ion type additive, as in the case of refrigerators).

An additional advantage of an individual accessory is that the user is assured that no spy device has been added to the device in order to retrieve his PIN code.

In a first particular implementation, the lower face comprises at least two contact pads.

Thus, when the entry device is placed on the touch panel, the terminal detects the contact pads and, by analysis of the results of this detection (number and shape of the pads, the distance between them), deduces therefrom the presence, the position and the orientation modulo 180° of the device on the touch panel. This assumes that the terminal knows the number of contact pads, their shapes, the distances between them and their positions within the geometry of the entry device.

If the terminal is small, it can be assumed that the entry device is well positioned. Therefore, in this case, an orientation can be assumed (and the modulo 180° ambiguity is removed). This is acceptable because when a key is touched and it does not work, that fact is realized immediately.

In one variant, the entry device comprises a single contact pad having a particular shape (for example oblong or rectangular, with sufficient length) enabling it to be identified and its orientation to be known (and from that, enabling also the orientation of the entry device to be known).

According to one particular characteristic of the embodiment, said at least two contact pads have different shapes.

Thus, the terminal can detect the orientation of the entry device without modulo 180°. In other words, the right orientation can be deduced even with two contact pads, provided that the second pad has a shape that is very different from the first pad (such as a circle (or a square) for the one and a rectangle whose length is twice its width for the other).

In a second particular implementation, the lower face comprises at least three contact pads.

Thus, the terminal can detect the orientation of the entry device without modulo 180°. Indeed, the set of the at least three contact pads forms a signature (a particular triangular geometry; a flat triangle in one particular implementation) proper to the data-entry device, which can be detected and recognized by the terminal when the device is placed on the touch panel.

According to one particular characteristic, the matrix of entry zones forming the keypad comprises a set of entry keys that are generally flat, formed on the upper surface and separated from each other by a grid of shaped structures of predetermined height and/or shape, and the network of conductive tracks is formed at the upper part of the grid of shaped structures.

Thus, the user (especially a visually impaired person) finds his way through the grid of shaped structures that demarcate the keys from one another, depending on the shapes and/or heights of these shaped structures. In one particular implementation, the key 'five' does not have the same height as the other numerical keys and/or the height of the numerical keys is not the same as that of the function keys, in order to make it easier for the user to find the position of the keys. In one particular implementation, the entry keys include no specific indication as to their function, so as to reinforce security by preventing a malicious person from watching the keys used for the entry.

Several advantages flow from the formation of the network of conductive tracks at the upper part of the grid of shaped structures:

the network of conductive tracks can stretch over a substantial part of the upper face of the entry device (because in practice the grid of shaped structures occupies almost the totality of the upper face of the entry device) and therefore interact with several nodes of the matrix of electrodes of the touch panel (the network of conductive tracks prompts transfers of charge, synchronous with the scanning of the panel, and are therefore not stable) and hence provides greater efficiency to prevent the terminal from carrying out a recalibration of the touch panel;

in the phase of data entry by the user (i.e. after the terminal has detected the presence and the orientation of the entry device on the touch panel), the network of conductive tracks improves the detection of the contact pad or pads because to touch the entry keys, the user's finger touches (or, if there is a protective varnish, approaches) the network of conductive tracks which is itself in electrical contact with the contact pad or pads. Hence, during the capacitive scanning cycles, charges are transferred (or attracted) not only by the contact pads but also by the user's finger. Hence, the local modification of the electrical field is greater (thus the signal is magnified at the locations of the pads) than it is during the initial phase of detection of the entry device (during which the user generally does not touch (or approach) or no longer touches or approaches the network of conductive tracks after having placed the entry device on the touch panel). It may be recalled that the finger does not need to touch: there is a capacitance between the user's finger and the network of conductive tracks. This behaves like two series-connected capacitances: a first capacitance between the touch panel and the contact pads, a second capacitance between the network of conductive tracks and the user's finger and, between these first and second capacitances, the resistance of the conductive elements connecting the contact pads and the network of conductive tracks.

According to one particular characteristic, the conductive tracks and the lower face are separated by a distance of 1.5 mm to 4.5 mm and the conductive tracks possess a width of 0.5 mm to 2 mm.

Thus, the network of conductive tracks possesses a capacitance relative to the touch panel that is low enough not to be detected as a meaningful touch (or tap) but sufficient for its interaction with the touch panel to prevent a recalibration of this panel. In addition, the height of the network of conductive tracks (relative to the touch panel) makes it possible, whatever the position of the entry device (in X/Y coordinates) on the touch panel, to have a distance relative to the electrodes of the touch panel that is fairly great and almost constant.

According to one particular characteristic, the lower face comprises at least two contact pads and the network of conductive tracks possesses a resistance, between the contact pads, ranging from 20Ω to 150 kΩ.

Thus, the reactivity of the matrix of keypad-forming entry zones is improved.

In a first particular implementation of the network of conductive tracks, the network of conductive tracks is imprinted on the upper face and covered with a non-conductive, anti-abrasion layer.

Various techniques enable this first implementation. For example, the conductive tracks are screen-printed (reverse screen-printed film followed by overmolding) and the protective layer is a varnish. It may be recalled that, despite the fact that the user does not directly touch the network of conductive tracks, he brings his finger to a very small distance from it. There is therefore a low capacitance between the network of conductive tracks and the user's finger which is series-connected with another capacitance (the one between the touch panel and the contact pads) via the conductive tracks (the resistance of which changes the RC circuit).

In a second particular implementation of the network of conductive tracks, the network of conductive tracks is made of a thick conductive material having a thickness of at least 0.3 mm.

Various techniques enable this second implementation. For example, the thick conductive material is carbon-charged silicone material made by co-molding (conductive insert in a silicone mold).

According to one particular characteristic, the plate is constituted by an electrically insulating matrix.

Thus, the plate (i.e. the main body of the entry device) is prevented from having a capacitance (throughout its surface) detected by the pad.

In a first particular implementation of the plate, the plate consists of a rigid and transparent plastic material.

Thus, the entry device is securing. Indeed, owing to the transparency of the plate, it is not possible to adjoin fraudulent entry-monitoring mechanisms thereto. The fact is that if such mechanisms were to be added, they would be immediately detected.

According to one particular characteristic of the first particular implementation of the plate, the lower face possesses four corners and, in at least one of the two adjacent corners among said corners, it possesses a generally flat foot with a thickness of 0.1 to 0.4 mm. In one particular implementation, the lower face comprises one foot at each of the two "top" corners (in the plane of the upper face of the plate) thus preventing an instability or imbalance of the entry device, whether the plate is concave or convex. The "bottom" corners (in the plane of the upper face of the plate) are for example aligned with the contact pad or pads. In one variant, the lower face furthermore comprises a foot in each of the two "bottom" corners (giving four feet in all).

In this way, when the data-entry device is placed on the touch pad, the feet ensure that the contact pad or pads is or are truly in contact with the touch pad, even if the pad is not perfectly flat (the height of the feet is adapted to the flatness of the plate).

In a second particular implementation, of the plate, the plate is constituted by translucent silicone enabling it to change shape and perfectly match the flatness of the touch panel.

Thus, when the data-entry device is placed on the touch panel, the contact pad or pads is or are truly in contact with the touch panel. The translucence also makes it possible to verify that no fraudulent mechanism has been inserted therein.

In addition, the fact of using silicone gives a major frictional coefficient relative to the pad and therefore limits undesired translation and therefore facilitates the entry of the code. In other words, the silicone enables adhesion to the touch panel (even without suction pads) and this truly helps visually impaired or sightless persons.

According to one particular characteristic, the entry device comprises at least one suction pad and/or at least one anti-slip foot made out of an anti-skid material fixedly attached to the lower face and intended to come into contact with the touch panel.

Thus, the entry device can be held against the touch panel even if it is not placed in a flat position (a sloping touch panel). It furthermore means that the position-finding search by the visually impaired person will not cause the entry device to slip out of the active area of the touch panel (which would be highly disorienting for a blind person). According to one particular characteristic, the plate appreciably has the dimensions of a bankcard in length and width.

The choice of the dimensions of a bankcard (54 mm×85 mm) plus or minus a few millimeters (for example plus or minus 2 or 3 mm) has several advantages:
- it amounts to a surface area that is enough for the network of conductive tracks to disturb the capacitive detection of the touch panel to an extent that is sufficient for it not to get recalibrated by itself;
- this surface area makes it possible to have entry zones (keys) that are sufficiently big;
- it enables the entry device to be placed in a wallet or a card holder and therefore converts the entry device into an individual accessory;
- the entry device itself can serve as a bankcard holder for the blind (for example through hinges, sliding elements, etc.).

According to one particular characteristic, the keypad-forming matrix of entry zones represents a keypad for entering a confidential code into a payment terminal.

4. LIST OF FIGURES

Other features and advantages of the invention shall appear from the following description, given by way of an indicative and non-exhaustive example, and from the appended drawings, of which.

5. DETAILED DESCRIPTION

In all the figures of the present document, the identical elements and steps are designated by a same numerical reference.

5.1 Reminders on Capacitive Touch Panels

There are numerous technologies exploiting capacitance phenomena to detect the position of a finger on a touch panel. The two most widespread technologies are surface capacitive technology and PCT or PCAP (projected capacitive touch) technology. The latter technology can generally be divided into two sub-categories: self-capacitance technology and mutual capacitance technology.

5.1.1 Surface Capacitive Technology

The simplest way to manufacture a capacitive touch panel is to coat one side of the screen with a conductive transparent layer, for example made of indium-tin oxide (ITO). Low voltage is applied to the four corners of the panel, creating a uniform electrical field. When a finger touches the other side of the glass, the controller (also called a control unit, processor or microprocessor) of the panel can determine the location of the tactile input by analyzing the measured change in capacitance from changes in voltage in the four corners of the panel. It is not possible to recognize multi-touch entry points. The untimely detection of false entries, caused by unexpected signals coming from the environment, can also be a problem.

5.1.2 Projected Capacitive Technology

In projected capacitive technology, electrodes (conductive wires) are applied in rows and columns on two parallel sheets of glass, forming a grid of electrodes. A voltage is applied sequentially to the rows and columns of electrodes. The controller identifies the location of the touch input by measuring the change in capacitance in the grid of electrodes.

5.1.2.a) Projected Self-Capacitance Technology

A touch panel according to projected self-capacitance technology is similar to a surface capacitance panel but the two layers of ITO are etched with electrodes in rows on one face and electrodes in columns on the other face. The controller measures the capacitance of each electrode (in rows and in columns) relative to a reference signal (most frequently the ground). The principle of variation of capacitance is identical to that of the surface capacitance technology. The rows and columns are scanned, and the equivalent capacitance is measured for each electrode. Since each row and each column operates independently, this technology does not enable the simultaneous detection of several activation points. Ghost phenomena can appear when two fingers are on the touch panel. To meet market demand, this technology has been improved to provide multi-touch solutions without ghost phenomena.

5.1.2.b) Projected Mutual Capacitance Technology

The structure of a touch panel according to projected mutual capacitance technology is identical to the structure according to the projected self-capacitive technology but multi-touch detection is possible through the controller's acquisition method. The controller measures the capacitance between the pair of electrodes comprising an X electrode (row) and a Y electrode (column). Without activation, the capacitance between this pair of electrodes remains constant. When the finger is in proximity to an electrode, the capacitance varies. In certain implementations, the X and Y electrodes are on the same face and, at each intersection, the electrodes are insulated by an insulating layer. The measurement of the variation of capacitance between each pair of X and Y electrodes determines the x and y coordinates of the activation zone.

In other words, the touch panel comprises electrodes in rows and in columns forming a matrix of electrodes comprising nodes. The controller (control unit) performs capacitive scanning cycles in order to measure variations in capacitance of the nodes relative to reference values and detect meaningful touches on the touch panel as a function of the variations in capacitance measured. For each node, the controller makes a comparison between the variations in capacitance and a variation threshold. Depending on the nodes where the variation of capacitance is great, and on the surface or surfaces that they form, the controller takes a decision and gives a result indicating whether one or more meaningful touches on the touch panel (by an electrical conductive element such as a finger or a stylus) have been detected.

The patent document WO2011/084917A2 describes an example of implementation of a touch panel according to the projected mutual capacitive technology.

For the decision by the controller, the threshold as well as the surfaces have parameters that depend on the panel. For example, for a specific panel, let us imagine reference values of the order of 7000 units. If a finger is placed on the panel, the variation of capacitance is of the order of 1000 and several nodes are impacted (there is therefore a major surface area): the controller detects the finger. If a stylus is placed on the panel, the variation in capacitance is of the order of 300 (rubber is less electrically conductive), and few nodes are impacted (there is therefore a small surface area): the controller detects the stylus. If the tip of a needle is placed on the panel, even if the variation in capacitance is very high, there is only one node involved (the surface area is too small and is not in the acceptance template): the controller does not select the contact point of the needle and detects no meaningful touch. In these examples, the user's finger (or the conductive stylus or again the needle linked to a user) behaves like a parallel capacitance that already possesses major charge. Performing a monitoring scan of the capacitances creates an easily identifiable point of discharge of the charges.

5.1.3 Recalibration of the Touch Panel (in Projected Mutual Capacitive Technology)

As indicated further above, in projected mutual capacitive technology, the controller permanently monitors the variations in capacitance at the nodes of the matrix of electrodes (by comparing each variation with a reference value), and indicates whether one or more meaningful touches on the touch panel have been detected (in taking account of a minimum surface area, expressed in number of nodes, for a touch to be meaningful).

The reference values can be reviewed as a function of events: this is the recalibration of the panel. For example, if a conductive object (for example a drop of water) comes into contact with the panel, the variations in capacitance for the nodes concerned are detected very rapidly. And therefore, a meaningful touch (the surface area of which corresponds to that of the zone of contact between the conductive object and the panel) is chosen by the controller. However, at the end of a few cycles of capacitive scanning, this contact zone, which is isolated from the rest of the panel, has been charged by the scans and is saturated: the controller detects that this is an additional noise and reviews (increases) the reference values for the concerned nodes of the panel. Following this change of reference values, the controller, during the following scanning cycles, detects that for the concerned nodes, the variation of capacitance is not greater than the variation threshold, and the controller stops considering it to be a meaningful touch.

In other words, in the projected mutual capacitive technology, the controller carries out a recalibration of the touch panel, i.e. an update, at the end of some cycles of capacitive scanning, of one or more of the reference values associated with the nodes of the matrix of electrodes. This makes it possible to obtain the disappearance, from the detection results of the controller, of any electrically conductive object (for example a drop of water) that comes into contact with the touch panel and has an excessively stable behavior and therefore constitutes additional noise to be eliminated (unlike a touch by the user's finger).

Similarly, if the hand is brought closer to a capacitive panel, even in being very far away (about a few centimeters), since the surface area of the hand is great, there is an induced capacitance that can be measured. However, by setting the parameters of the panel (large surface area, low capacitance variation), the controller can ignore this surface area.

A panel without dynamic recalibration will have erratic operation, while a panel with too much recalibration will not be able to detect the taps or touches with weakly capacitive objects. The recalibration can be done on a stable charge or on a minimum surface area, when starting or as required.

5.2 First Embodiment of the Entry Device

Referring to FIGS. 1 to 7, we describe a data-entry device 1 and a terminal 2 according to a first embodiment of the invention.

Figures 1, 2A, 2B, 10:
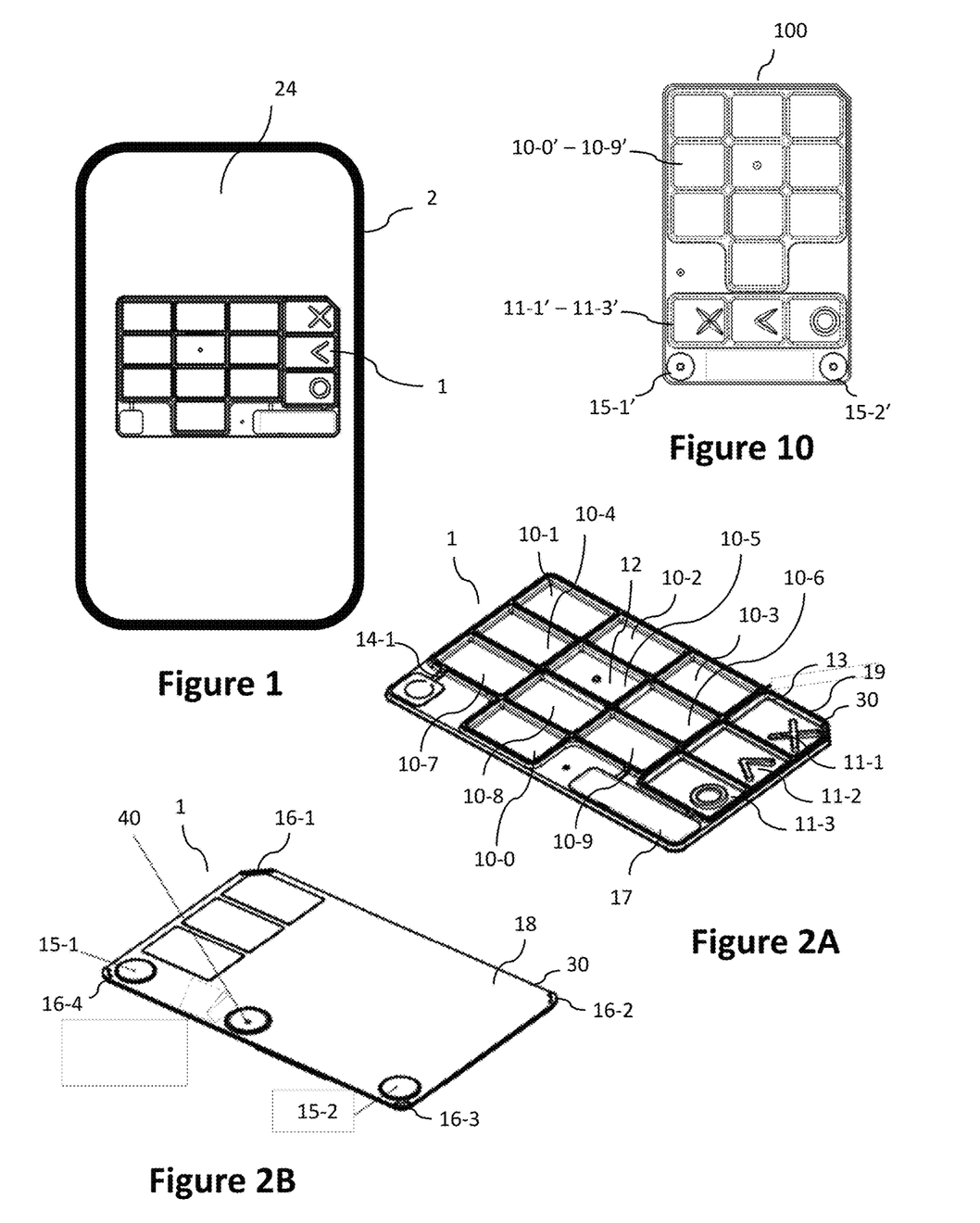
FIG. 1 illustrates a data-entry device and a terminal according to a first embodiment of the invention.
FIGS. 2A and 2B are detailed views of the upper face and lower face respectively of the entry device of FIG. 1.
FIG. 10 illustrates a data-entry device according to a second embodiment of the invention.

As illustrated in FIG. 1, the data-entry device 1 is to be placed on a touch panel 24 of the terminal 2 (this is for example a communications terminal acting as a payment terminal). The terminal 2 and the entry device 1 constitute a data entry system, especially but not exclusively for visually impaired persons.

The touch panel 24 is a touch panel according to projected mutual capacitive technology (see description here above). It comprises electrodes in rows and columns forming a matrix of electrodes comprising nodes. It is managed by a controller (also called a "control unit"), for example the processor 21 of the terminal 2 (see FIG. 8), configured to carry out capacitive scanning cycles and to measure variations in capacitance of the nodes relative to a reference value; detect meaningful touches on the touch panel as a function of the measured variations in capacitance; calibrate the reference values as a function of the measured variations in capacitance.

As illustrated in FIGS. 2A and 2B, the data-entry device 1 comprises:
- a generally parallelepiped-shaped plate 30 comprising a generally flat lower face 18 for placing the device 1 on the touch panel 24, and an upper face 17 comprising a matrix of keypad-forming entry zones, the entry zones 10-0 to 10-9 and 11-1 to 11-3 having a thickness configured to enable a detection of a finger on the touch panel when the device is placed on the touch panel (see FIG. 3, the thickness of the key referenced 10-5 is denoted as e2 and is for example equal to 0.2 mm);
- two contact pads 15-1 and 15-2 which are flat, electrically conductive and fixedly attached to the lower face 18 of the plate 30; and
- a network of conductive tracks 9 that extends on at least one part of the upper face 17 of the plate 13 and is electrically connected to the contact pads 15-1 and 15-2.

The matrix of entry zones comprises a set of substantially rectangular entry keys grouped together in a first subset and a second subset. The set of entry keys represents an entry keypad for entering a confidential code on a payment terminal.

The first subset comprises ten numerical keys 10-0 to 10-9 representing the digits 0 to 9. The numerical keys are generally flat and comprise no specific indication as to the digits that they represent. This prevents a malicious person from monitoring the keys that are used for the entry. The key for the digit five 10-5 comprises, at its center, a position-locating pin 12. The keys for the digits 1 to 4 and 6 to 9 are positioned around the key for the digit 5, as is customary. The fact of identifying the key for the digit 5 enables the visually impaired user to rapidly achieve a mental visualization of the positions of the other numerical keys. In one particular implementation, there is a difference of thickness around the key 'five' so that, if the person loses orientation, he can return to the key five, without pressing on this key.

The second subset comprises three function keys: a cancel key 11-1, an erase key (correction) 11-2 and a confirm key 11-3. The function keys comprise embossed or hollow patterns indicating the functions of the keys. For example, the pattern "X" represents the cancel function, the pattern "<" represents the erasure function, and the "O" represents the confirm function.

In short, in the plane of the upper face 17 of the plate 30, the ten numerical keys 10-1 and 10-9 are disposed on four rows and three columns, to the left of the three function keys 11-1 to 11-3 which are themselves disposed on a column.

The keys of the matrix of entry zones are separated from each other by a grid of shaped structures 13, having predetermined heights and shapes. The shapes of the shaped structures P1 to P4 of the grid of shaped structures 13 are adapted so as to form a plurality of position-identifiers or position-locators for the keys of the keypad. More particularly, the shaped structures form one or more position-finding "threads" that enable a visually impaired user to mentally locate the position of the keys. For example, the shaped structures form a peripheral linking thread throughout the entire rim of the entry device enabling the demarcation of the external volume of the entry device. At each key, shaped structures also indicate the location of the key.

In addition, in one particular implementation, a corner of the entry device (for example at the top right) is beveled and enables the user to orient the entry device without possibly confusion.

The thickness of the plate 30 in the zone of the functional keys is smaller than the thickness in the zone of the numerical keys. There is thus a change in level between the numerical keys and the functional keys. This change in level enables visually disabled persons to easily identify the numerical keys and the functional keys.

Figure 3:
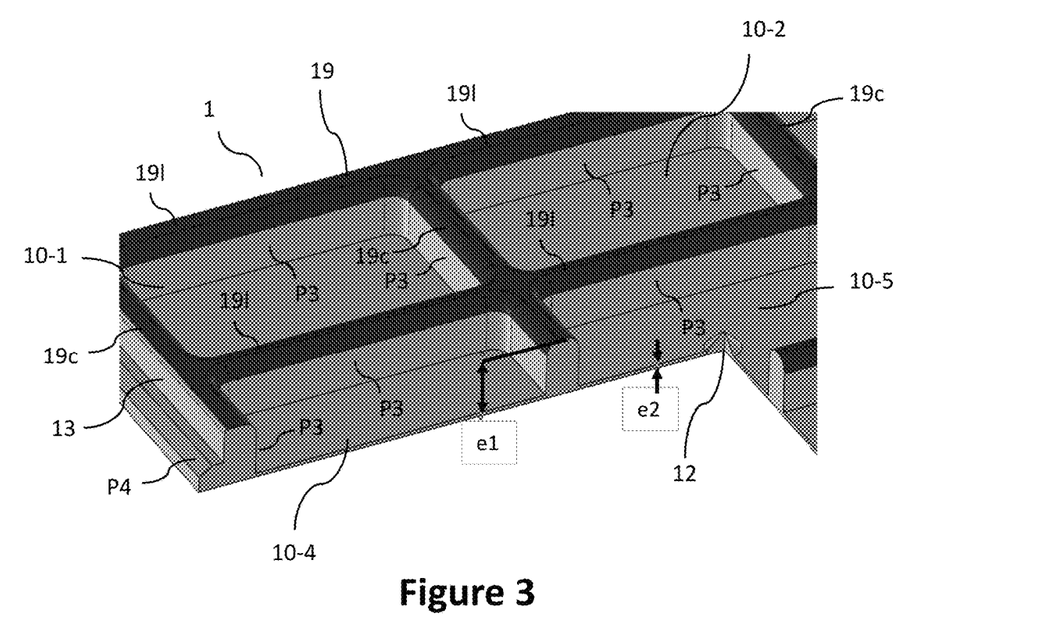
FIG. 3 is a view of a part of FIG. 2A providing a detailed view of the grid of shaped structures and the network of conductive tracks appearing in FIG. 2A.
Figure 4:
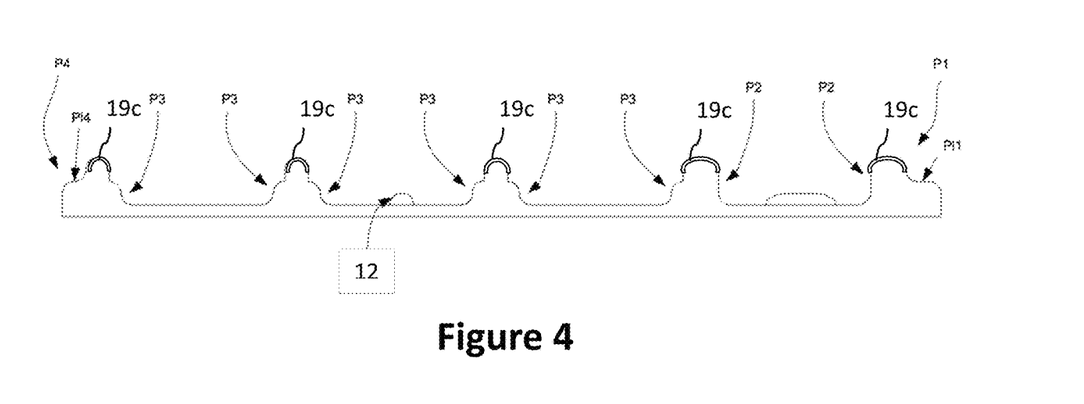
FIG. 4 is a view in section of the data-entry device at the third row of keys presenting one embodiment of the grid of shaped structures.

FIG. 4 is an illustration by way of an example of a possible longitudinal section of the entry device 1 of FIG. 1, at the level of the central keys 10-4 to 10-6 and 11-2. It illustrates an embodiment of the different shaped structures P1 to P4 for the keys. FIG. 3 also illustrates the different shaped structures P3 and P4 for the keys 10-1, 10-2, 10-4 and 10-5. A first shaped structure P1 determines the right lateral edge of the entry device. The shaped structure P2 of the correction key (see FIG. 1) takes the form of a vertical slope. The shaped structures P3 of the numerical keys are generally wave shaped. They are different from the shaped structure P2 enabling the visually impaired user to differentiate the numerical keys from the function keys. The outer left shaped structure P4 is also different from the outer right shaped structure P1, especially in the size of the plates (P14 vs P11), thus enabling the user to determine the orientation of the device when it is placed on the touch panel. The pin 13 of the key 10-5 is also visible on this key and enables the key five to be speedily identified.

The plate 30 is constituted by an electrically insulating material so as not to send out a parasitic capacitance that is hard to control.

In one particular implementation, the plate is constituted by a rigid and transparent plastic material.

Figure 5:
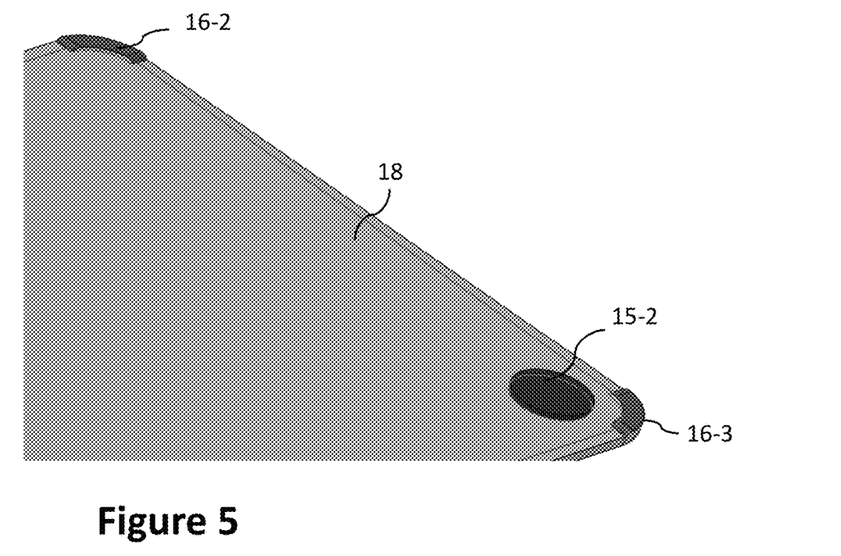
FIG. 5 is a detailed view of a part of FIG. 2B, illustrating a contact pad and two feet.
Figures 6, 7:
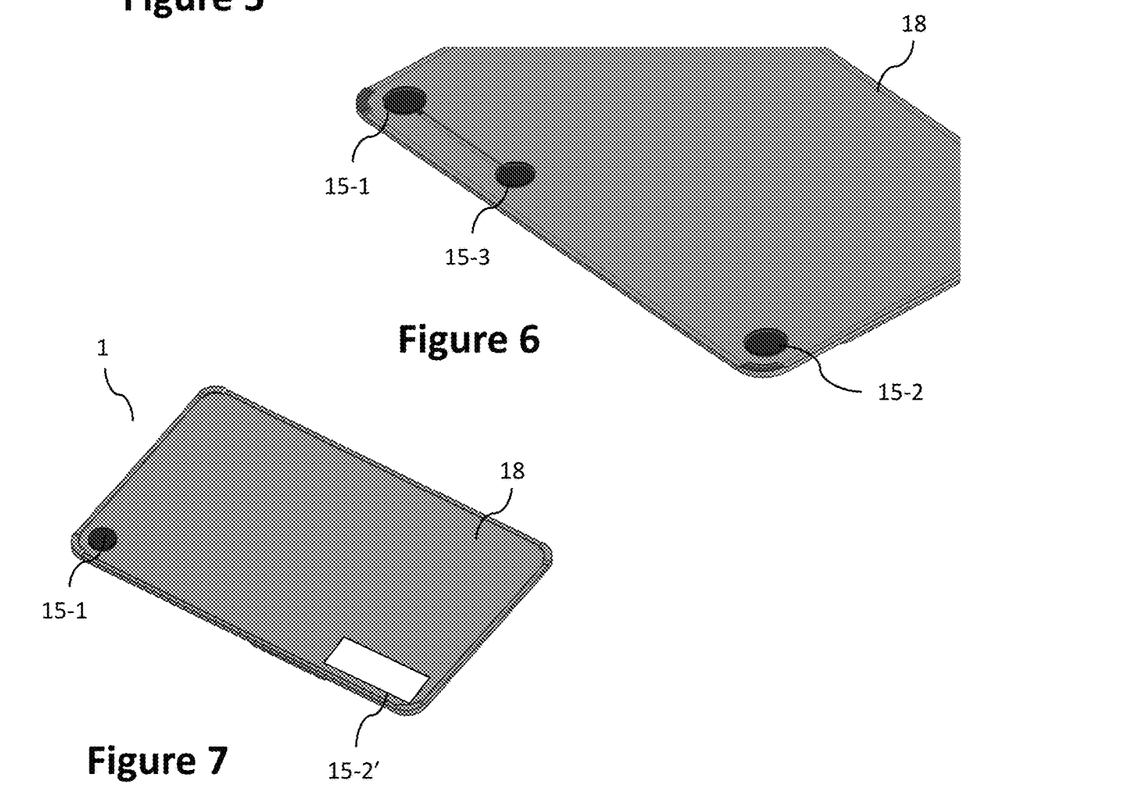
FIG. 6 illustrates a first variant of the set of contact pads.
FIG. 7 illustrates a second variant of the set of contact pads.

Optionally, as illustrated in FIGS. 2B and 5, the lower face 18 of the plate 30 comprises, at each of its four corners, a generally flatfoot 16-1 to 16-4 with a thickness of 0.1 to 0.4 mm. The feet are aimed to ensure that it is the contact pads 15-1 and 15-2 that press on the touch panel 24 even if the plate 30 is a little twisted.

In one variant, the lower face also comprises only two feet, those referenced 16-1 and 16-2 (i.e. those situated in the two "top" corners in the plane of the upper face of the plate). This prevents an instability of the entry device, whether the plate is concave or convex.

Figure 11:
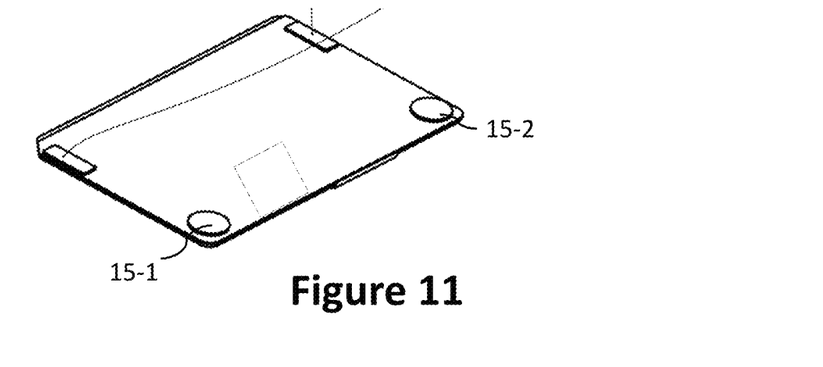
FIG. 11 illustrates a variant in which the lower face comprises two anti-slip feet.

In one particular implementation illustrated in FIG. 11, the lower face 18 of the plate 30 comprises one or more anti-slip feet 16-1' and 16-2' made out of an anti-skid material. This is for example a material with numerous studs that behave like the setae or bristles of the Gecko lizard's foot. With these anti-slip feet, once the entry device is placed on the touch panel 24, it does not move during the data entry. This is particularly efficient on glass.

Optionally, the lower face 18 of the plate 30 comprises, for example in its middle, a suction pad (40) fixedly attached to the lower face and intended to come into contact with a touch panel 24. This enables the use of the entry device 1 even with a sloping touch panel 24 and, in addition, prevents it from slipping on classic terminals.

In another implementation, the plate 30 is constituted by non-conductive translucent silicone, the hardness of which is for example 60 to 90 Shores A. Thus, the plate can get deformed and perfectly match the flatness of the touch panel (and therefore in principle does not require any foot). In other words, the making of the silicone plate enables it to adhere to the touch panel, to be deformable under its weight and have good shape memory.

The plate 30 for example appreciably has the dimensions of a bankcard (54 mm×85 mm, plus or minus a few millimeters). This enables the entry device 1 to be placed in a wallet or a card-holder, in the same place as the bankcard.

The lower left and right corners of the upper face 17 of the plate 3 comprise no key. It is in the corresponding areas (i.e. superimposed areas) of the lower face 18 of the plate 30 that the two contact pads 15-1 and 15-2 are positioned.

The two contact pads 15-1 and 15-2 are very flexible and flat so as to maximize their surface area in contact with the touch panel 24. They possess for example the shape of a disk having a diameter of 6 to 8 mm They are for example constituted by conductive silicone, the hardness of which ranges from 40 to 80 Shores A. Other techniques can be used to make contact pads: metal parts, drawings made with conductive inks (directly on the lower face of the plate, and on a film that is itself then transferred to the lower face of the plate) etc.

The distance between the centers of the contact pads is determined and known to the controller of the terminal who, after having detected the two contact pads (see method described further below), can thus detect that the entry device 1 has been placed on the touch panel 24. From this, the controller can also deduce the position and orientation modulo 180° of the entry device 1 on the touch panel 24.

In a first variant (illustrated in FIG. 6), the entry device comprises at least three contact pads 15-1, 15-2 and 15-3. Thus, the controller can detect the orientation of the entry device without the modulo 180° value. In addition, with three contact pads, there is less possible confusion with a line between centers of fingers placed on the touch panel.

In a second variant (illustrated in FIG. 7), the two contact pads 15-2 and 15-2' possess different shapes (for example a disk in one case and a rectangle in the other). Thus, the controller can also detect the orientation of the entry device without the modulo 180°.

In a third variant (not shown), the entry device comprises a single contact pad having a particular shape (for example oblong or rectangular, with sufficient length). Thus, the controller can identify the single contact pad and know its orientation (modulo) 180°; and thereby also know the orientation (modulo 180°) of the entry device when it is placed on the touch panel.

In FIGS. 2A, 3 and 4, the network of conductive tracks 19 is represented in black. It comprises tracks disposed in rows 19*l* and in columns 19*c*, which form a grid on a substantial part of the upper face 17 of the plate 30.

The network of conductive tracks 19 is connected electrically to the contact pads 15-1 and 15-2 via electrical connections 14-1 (only one connection can be seen in FIG. 2A) (for example sections of conductive tracks and via holes). In one variant, the contact pads 15-1 and 15-2 form the thickness of the plate (in this case, the via holes are not necessary).

In the particular implementation illustrated, the network of conductive tracks 19 is formed at the top part of the grid of shaped structures. In other words, each conductive track 19*c*, 19*l* is formed at the top part of one of the shaped structures P1 to P4. Thus, advantage is taken of the presence of shaped structures demarcating and separating the keys of the matrix of entry zones.

We now present, by way of an example, a set of characteristics of the network of conductive tracks 19 enabling efficient operation with a touch panel having a diagonal size of 4" (10.2 cm) to 7" (17.8 cm), with 14 rows and 24 columns, and accepting styluses (hence capable of measuring low variations in capacitance).

The network of conductive tracks 19 must extend on a sufficiently large surface area thus enabling action with a greater number of nodes of the matrix of electrodes (row/column intersection) of the touch panel and therefore making it possible to have a charge that varies during capacitive scans. This is especially the case when the network of conductive tracks 19 is formed at the top part of the grid of shaped structures and when the plate 30 has appreciably the dimensions of a bankcard (i.e. approximately 54 mm×85 mm).

The network of conductive tracks 19 and the lower face 18 of the plate 30 are separated by a distance (height denoted e1 in FIG. 3) ranging from 1.5 mm to 4.5 mm. The conductive tracks have a width of 0.5 mm to 2 mm.

Thus, the network of conductive tracks has low capacitance, enabling it both to interact with the touch panel during capacitive scans (and to make the charges of the network of conductive tracks move, thus preventing a recalibration of the touch panel by the controller) and also not be detected as a meaningful variation of capacitance (which would prompt the false detection of a meaningful touch or tap).

It is possible to make narrower conductive tracks, but they must be brought closer to the touch panel. Conversely, it is possible to make wider conductive tracks, but they must be moved away from the touch panel.

However, it is preferable to meet the minimum value of the height e1 (1.5 mm). Indeed, given that the entry device has a free position on the touch panel, and that the positions of the nodes of the matrix of electrodes (row/column intersection) of the touch panel are not known, it is possible to have perfect alignment of a conductive track with an electrode (row or column) of the touch panel. If this is the case, and if the distance between this conductive track and this electrode is small, then the capacitance between these two elements (track and electrode) will increase significantly, and this is undesirable. With the minimum value of the height e1, we remain with low capacitance for the network of conductive tracks.

The minimum value of the height e1 (4 mm) can (in theory) be surpassed but here it is the ergonomy, for accessing the bottom of the keys, that is impacted.

In one variant, the range of values of the height e1 is met but the network of conductive tracks 19 is not formed at the upper part of the grid of shaped structures. It is for example formed on the plane of the upper face 17 of the plate 30, in a zone that adjoins and/or surrounds the one in which the keys of the matrix of entry zones are located. In this case, the total surface area of the plate 30 can be increased relative to the particular implementation illustrated.

The network of conductive tracks possesses a resistance, between contact pads, ranging from 20Ω to 150 kΩ. A relatively low resistance improves the reactivity of the entry device 1.

Various techniques can be used to form the network of conductive tracks, especially (but not exclusively):
- printing the network of conductive tracks 19 (for example by silver-ink pad printing) directly on the upper parts of the shaped structures (for example made of non-conductive silicone) and then the addition to the conductive tracks of an anti-abrasion non-conductive layer (not shown) (for example made of non-conductive varnish);
- making of the network of conductive tracks 19 out of a conductive material (for example conductive silicone) and thick material (having for example a thickness of at least 0.3 mm) followed by overmolding of the network of conductive tracks 19 on the grid of the shaped structures 13;
- printing the network of conductive tracks 19 on a film, and then transferring the film to the grid of shaped structures 13 by thermoforming and/or overmolding;
- etc.

In short, the network of conductive tracks 19 is configured so that, when the entry device 1 is placed on the touch panel and even in the absence of pressure of a finger on the network of conductive tracks, the network of conductive tracks interacts with the touch panel during the cycles of capacitive scanning (preventing a recalibration of the reference values (which itself would prevent each of the contact pads 15-1 and 15-2 from being detected as a meaningful touch or tap) without the network of conductive tracks 19 being itself detected as a meaningful touch.

Indeed, it is known that the capacitance is defined as being proportional to the facing surface area and inversely proportional to the insulation distance. The contact pads 15-2 and 15-2, which are very close to the electrodes of the touch panel 24, therefore have a measurable capacitance (of the order of the capacitance of a stylus), enabling each of them to be detected as a meaningful touch while the network of conductive tracks 19 (greater height e1 with thinner conductive tracks) has a far lower capacitance enabling it not to be detected as a meaningful touch.

However, the network of conductive tracks 19 has another major characteristic: it stretches over a greater surface area than the contact pads and therefore even if its capacitance is low, it interacts with several nodes of the matrix of electrodes (row/column intersection) of the touch panel. The fact that the conductive tracks are networked enables the charges to flow freely therein. Thus, during the capacitive scans, charges move back and forth in the network of conductive tracks, as well as between the contact pads and the network of conductive tracks. This therefore very slightly changes the charge of the network of conductive tracks and the contact pads. Hence, for the concerned nodes of the matrix of electrodes (i.e. those situated facing the network of conductive tracks and contact pads), the controller measures variations in capacitance (relative to the reference values) which are not fixed in successive cycles and therefore decides not to recalibrate the touch panel (i.e. not to modify the reference values for the nodes concerned). This non-recalibration enables each of the contact pads 15-1 and 15-2 to continue to be detected as a meaningful touch or tap.

In addition, the proposed design (network of conductive tracks 19 electrically connected to the contact pads 15-1 and 15-2) has the interesting feature of having a large dynamic range for the detection of the contact pads:
- in a second phase of entry of the code (which follows the first phase of detection of the entry device, even without pressure from a finger on the network of conductive tracks), i.e. when the user's finger presses on the zones of the keys (and is therefore in contact with these keys), or
- in the first phase of detection of the entry device, if the user's finger is in proximity to the network of conductive tracks.

5.3 Second Embodiment of the Entry Device

FIG. 10 illustrates a data-entry device 100 according to one variant of the first embodiment of the invention in the "portrait" format, which is particularly adapted for use with touch panels also of the "small format" portrait type (for which the data-entry device 1 of the first embodiment with the "landscape" format will not be usable. Its operation is exactly the same as that of the first embodiment.

More specifically, in the plane of the upper face 17 of the plate 30, the ten numerical keys 10-0' to 10-9' (still on four rows and three columns) are disposed above (and no longer to the left) of the three function keys 11-1' to 11-3', itself disposed on a row (and no longer on a column).

The lower, left and right, corners of the upper face 17 of the plate 3 have no key. It is in the corresponding zones (i.e. superimposed zones) of the lower face 18 of the plate 30 that the two contact pads 15-1' and 15-2' are positioned.

The distance between centers of the contact pads is not the same as in the first embodiment. Thus, the controller of the terminal, which knows the distance between centers of the contact pads of each of the types of the entry device 1, 100, can detect which type of entry device has been placed on the touch panel (and thus deduce therefrom the position of each of the keys of the entry device placed).

In addition, in one particular implementation, a corner of the entry device (for example at the top right, see FIG. 10) is beveled and enables the user, without any possible confusion, to orient the entry device. This prevents the user from placing the entry device horizontally.

4 Example of a Structure of the Terminal

Figure 8:
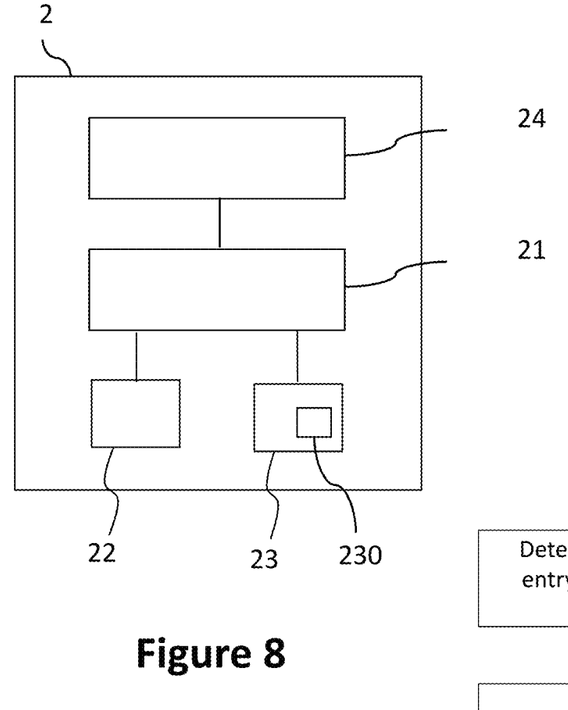
FIG. 8 is an example of a structure of the terminal of FIG. 1.

FIG. 8 presents an example of a structure of the terminal 2 of FIG. 1, implementing a data entry method according to the invention (for example the particular embodiment described with reference to FIG. 9).

The terminal 2 comprises a touch panel 24 (see description further above), a random access memory 22 (for example a RAM), a processing unit 61 (forming notably the controller (control unit) of the touch panel 24; see description further above), equipped for example with a processor and managed by a computer program 230 stored in a read-only memory 23 (for example a and a hard disk drive). At initialization, the code instructions of the computer program 230 are for example loaded into the random-access memory 22 and then executed by the processor of the processing unit 21.

This FIG. 8 illustrates only one particular way, among several possible ways, of obtaining the algorithm described in detail here below with reference to FIG. 9. Indeed, the technique of the invention can be carried out equally well on a reprogrammable computing machine (a PC computer, a DSP processor or a microcontroller) executing a program comprising a sequence of instructions or on a dedicated computation machine (for example a set of logic gates such as an FPGA or an ASIC or any other hardware module). Should the invention be implanted on a reprogrammable computation machine, the corresponding program (i.e. the sequence of instructions) could be stored on a storage medium that is detachable (such as for example a floppy disk, a CD-ROM or a DVD-ROM) or non-detachable, this storage medium being partially or totally readable by a computer or a processor.

5.5 Example of a Method of Entry

Figure 9:
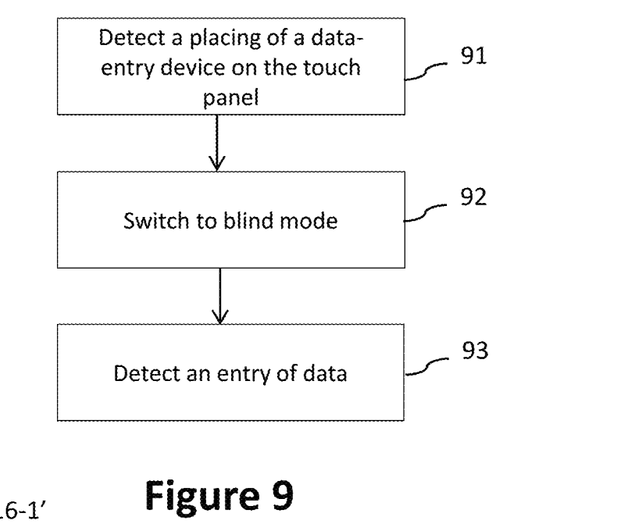
FIG. 9 is a flowchart of a method according to one particular embodiment of the invention executed by the terminal.

FIG. 9 presents a flowchart of a method according to one particular embodiment of the invention executed by the terminal 2.

In a step 91 (first detection), the terminal detects a placing of the entry device 1 on the touch panel 24. This first detection is based on a detection of the contact pad or pads 15-1 and 15-2.

When the entry device 1 is placed on the touch panel, the controller of the touch panel detects both or all three contact pads and, as the case may be, one or more meaningful touches if the user is holding the entry device in his hand and if one of his fingers touches the touch panel. As explained further above, this detection is possible because the contact pads are electrically conductive and in direct contact with the touch panel. The level of detection of the contact pads is acceptable because it is lower than if the touching or tapping were to be done with a finger but comparable to that of a stylus. It may be recalled that the network of conductive tracks is not detected but enables avoiding a recalibration of the touch panel (which would prevent the detection of the contact pads).

In addition, since the spacing between the contact pads is known to the controller (plus or minus a few variations), this controller is capable of recognizing that it is an entry device 1 that has been placed.

The controller also determines the position and orientation of the entry device 1 on the touch panel. For the orientation, it depends on the number of contact pads possessed by the entry device:
- with three contact pads, the controller knows how to orient the entry device;
- with two contact pads, the orientation is done modulo 180°. The controller then verifies that at least one position of the entry device makes it possible to have a function keypad.

In one particular implementation, the controller also verifies that each of the entry zones (keys) 10-0 to 10-9 and 11-1 to 11-3 is present at least partially in an active zone of the touch panel 24. It is considered for example that if 80% of a key is in the active zone, then this is still acceptable.

Each user can have his own control over the entry device. Indeed, certain persons may place it, flat, others may press only the keys (without holding the entry device) while yet others will hold it with two fingers and press on the keys. It is therefore extremely important not to consider touches made outside the keypad to be meaningful touches while identifying the ones that are touches from the contact pads (which orient the keypad):

first solution: the controller of the touch panel records all the points detected. With all these points, the controller (or the microprocessor of the terminal if it is not the same as the controller) defines those detected points that correspond to the contact pads of the entry device and determines the orientation of the entry device (and therefore the keypad of this entry device). The controller then filters the other detected points: either as points that have to be taken into account or as points that have to be overlooked (because they corresponds to the fingers holding the device). The corollary is that the greater the ability to acquire detected points, the greater is the tolerance with regard to points detected outside the keypad. In addition, the fact of using three contact pads removes the need for "false entry devices" such as for example the fact of holding the entry device with two fingers spaced out by the planned distance between centers of two contact pads.

second solution: the controller keeps the positions of the contact pads in memory during the positioning (it is assumed that there is a reduced number of "parasite" fingers during this positioning). In this case, with these memorized positions, and assuming that the movements of the entry device can only be slow (slower than 40 mm/s for example), confusions of position are avoided.

At a step 92, if the determining and verification operations of the step 91 have been successful, the terminal switches into entry mode adapted to the data-entry device (here below called "blind mode"). To accept the true presence of the entry device and confirm to the user that there has been a switch into blind mode, a sound notification is emitted by the terminal. In addition, in order to secure the next phase of the data entry, the terminal erases the virtual keypad from the touch panel. In addition, in the blind mode, the setting of the parameters of the touch panel is for example such that it enables detection of lower levels during the entry of the PIN code. This enables compensation, if need be, for the fact that the user's finger is in contact with the touch panel 24 via the entry device 1.

In a step 93 (second detection), the terminal detects an entry of data by the user. This second detection is based on the detection of one or more touches or taps by a finger of the user on the keys of the entry device. Typically, for the entry of a confidential code (PIN code), the controller detects four successive touches on the keys of digits 10-0 to 10-9 followed by a touch on the confirm key 11-3. At the exit from the entry of the PIN code, there is again a switch over to a standard parameter-setting (normal mode).

The entry of a key in blind mode complies for example with the following rules managed by the controller:

any touches outside the template of the entry device are filtered out (i.e. not retained as meaningful touches). This can be due especially to the user holding the entry device or to palm effects;

the selection of the key is done by removing the finger (if we are on the same key as above);

touches of a duration smaller than a certain reference duration (for example from 1000 to 3000 ms) are filtered out. This enables especially the user to seek the point five without activating it and then enter his code. However, for a touch of a duration greater than the reference duration, the pressed key is considered to be pressed (meaningful touch) and there is a sound (or touch) feedback;

if two keys or more are pressed, simultaneously (which can be the case when a blind person is searching for keys or again when a person is finding his position by column) then the touches are ignored;

any touching on a key is acknowledged by a sound (or touch) feedback (this acknowledgement signal is for example identical, whatever the key touched).

Another way to filter out touches is to have a detection of force. In this case, it is not necessary to have a filter on the touching duration. It is possible, in addition or not in in addition to the detection of force, to add a haptic effect to the keypad.

The exit from the blind mode can be done in several ways. If a contact pad is no longer detected by the controller or if the controller detects that the keys are no longer in the active zone of the touch panel, then the user is notified, for example by a "negative" sound feedback (long low-pitched sound), that there is an exit from the blind mode and a return to the display in classic mode.

If the user has finished entering his code and if the code is right, then a "positive" notification is sent (for example a short double high-pitched sound) or else, if it is a false code, then a negative notification is sent (for example a triple, long and low-pitched sound). Thus, to identify the different messages, the invention uses signatures that have not only a different frequency (or musical note) but also a different rhythm.

With the proposed method, the entry device can be moved, and the invention is still capable of detecting it (with its orientation) and therefore of defining the key or keys touched. In addition, it is even possible to remove the entry device and then reposition it differently on the touch panel (even rotate it by 180°), and it continues to work.

The invention claimed is:

1. A system of data entry comprising:
a touch panel of a terminal; and
a data-entry device configured to be placed on said touch panel,
said touch panel being capacitive, comprising electrodes in rows and columns forming a matrix of electrodes comprising nodes and being managed by a control unit configured to carry out cycles of capacitive scanning and measurement of variance of capacitance of the nodes relative to reference values, detect meaningful touches on the touch panel as a function of the measured variations in capacitance and recalibrate the reference values as a function of the measured variations in capacitance,
said data-entry device comprising:
a generally parallelepiped-shaped plate comprising a generally flat lower face, for placing the device on the touch panel; and an upper face comprising a keypad-forming matrix of entry zones, the entry zones having a thickness configured to enable a detection of a finger by the touch panel when the device is placed on the touch panel;

at least one flat, contact pad that is electrically conductive and fixedly attached to the lower face, said at least one contact pad having a capacitance enabling the at least one contact pad to be detected as a meaningful touch; and a network of conductive tracks stretching over at least a part of the upper face and being electrically connected to said at least one contact pad, the network of conductive tracks having a capacitance such that it is not detected as exerting a meaningful touch, and occupying a surface area that is greater than the surface area occupied by said at least one contact pad and sufficient so that, during the capacitive scanning cycles, the network of conductive tracks interacts with several nodes of the matrix of electrodes in the form of charges that go back and forth in the network of conductive tracks, as well as between said at least one contact pad and the network of conductive tracks, thus changing the charge of the network of conductive tracks and of said at least one contact pad and, therefore, for the nodes of the matrix of electrodes, situated facing the network of conductive tracks and said at least one conductive pad, called concerned nodes, the control unit measures the variations in capacitance that are not fixed on successive cycles and decides therefore not to carry out a recalibration of the reference values for the concerned nodes.

2. The system according to claim 1, wherein the lower face comprises at least two contact pads.

3. The system according to claim 2, wherein said at least two contact pads possess different shapes.

4. The system according to claim 1, wherein the lower face comprises at least three contact pads.

5. The system according to claim 1, wherein the keypad-forming matrix of entry zones comprises a set of entry keys that are generally flat, formed on the upper surface and separated from each other by a grid of shaped structures of predetermined height and/or shape, and wherein the network of conductive tracks is formed at the upper part of the grid of shaped structures.

6. The system according to claim 1, wherein the network of conductive tracks and the lower face are separated by a distance of 1.5 mm to 4.5 mm and wherein the conductive tracks possess a width of 0.5 mm to 2 mm.

7. The system according to claim 1, wherein the lower face comprises at least two contact pads and wherein the network of conductive tracks possesses a resistance, between the contact pads, of 20Ω to 150 kΩ.

8. The system according to claim 1, wherein the network of conductive tracks is printed on the upper face and covered with a non-conductive, anti-abrasion layer.

9. The system according to claim 1, wherein the network of conductive tracks is made of a thick conductive material having a thickness of at least 0.3 mm.

10. The system according to claim 1, wherein the plate is constituted by an electrically insulating matrix.

11. The system according to claim 1, wherein the plate is constituted by a rigid and transparent plastic material.

12. The system according to claim 11, wherein the lower face possesses four corners and, in at least two adjacent corners among said corners, the lower face possesses a generally flat foot with a thickness of 0.1 to 0.4 mm.

13. The system according to claim 1, wherein the plate is constituted by translucent silicone enabling the plate to change shape and perfectly match the flatness of the touch panel.

14. The system according to claim 1, wherein the system comprises at least one suction pad and/or at least one anti-slip foot made out of an anti-skid material fixedly attached to the lower face and configured to come into contact with the touch panel.

15. The system according to claim 1, wherein the keypad-forming matrix of entry zones represents a keypad for entering a confidential code into a payment terminal.

* * * * *